(12) United States Patent
Zhang

(10) Patent No.: US 7,869,488 B2
(45) Date of Patent: *Jan. 11, 2011

(54) METHOD AND APPARATUS FOR REMOVING CODE ALIASES WHEN USING SHORT SYNCHRONIZATION CODES

(75) Inventor: Haitao Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1039 days.

This patent is subject to a terminal disclaimer.

(21) Appl. No.: 10/650,271

(22) Filed: Aug. 28, 2003

(65) Prior Publication Data

US 2005/0047490 A1      Mar. 3, 2005

(51) Int. Cl.
   *H04B 1/00* (2006.01)
(52) U.S. Cl. ...................................................... 375/150
(58) Field of Classification Search ................. 375/134, 375/137, 142, 143, 145, 149, 150, 152, 343, 375/350; 324/76.33, 378; 702/71; 370/209; 708/5, 410, 422, 426, 813; 704/216, 217, 704/218
See application file for complete search history.

(56) References Cited

U.S. PATENT DOCUMENTS

| | | | |
|---|---|---|---|
| 5,623,511 A * | 4/1997 | Bar-David et al. ........... 375/143 |
| 5,737,327 A | 4/1998 | Ling et al. | |
| 5,901,185 A | 5/1999 | Hassan | |
| 6,005,886 A | 12/1999 | Short | |
| 6,608,859 B2 | 8/2003 | De et al. | |
| 6,661,857 B1 * | 12/2003 | Webster et al. ............... 375/350 |
| 6,680,967 B1 | 1/2004 | Westman | |
| 6,721,293 B1 * | 4/2004 | Komulainen et al. ........ 370/335 |

(Continued)

FOREIGN PATENT DOCUMENTS

EP          0963071          12/1999

(Continued)

OTHER PUBLICATIONS

Teng Joon Lim, "Bias in CDMA Channel estimates with the use of short spreading sequences" IEEE, vol. 1, Sep. 6, 2000, pp. 288-291.

(Continued)

*Primary Examiner*—Sam K Ahn
(74) *Attorney, Agent, or Firm*—Howard E. Seo; Sayed H. Beladi

(57) ABSTRACT

A method and apparatus for estimating a communication channel impulse response h(t) is disclosed. The method comprises the steps of generating a data sequence $d_i$ having a constrained portion $Cd_i$ associated with at least two codes $w_0$, $w_1$, wherein a correlation $A_{code}(k)$ of the constrained portion $Cd_i$ with one of the codes $w_0$, $w_1$ is characterized by a maximum value at $k=0$ and less than maximum values at $k \neq 0$; generating a chip sequence $c_j$ having a chip period $T_c$ as the data sequence $d_i$ spread by a spreading sequence $S_i$ of length N; generating $co_m(t)=co(t+mNT_c)$ for $m=0, 1, \ldots, M$ by correlating a received signal $r(t)$ with the spreading sequence $S_i$, wherein the received signal $r(t)$ comprises the chip sequence $c_j$ applied to the communication channel; and generating an estimated communication channel impulse response $\hat{h}_M(t)$ as a combination of $co_m(t)$ and $d_m$ for $m=0, 1, \ldots, M$.

73 Claims, 9 Drawing Sheets

U.S. PATENT DOCUMENTS

| | | | |
|---|---|---|---|
| 6,956,893 | B2 | 10/2005 | Frank et al. |
| 7,177,376 | B2 | 2/2007 | Atungsiri et al. |
| 2003/0081656 | A1* | 5/2003 | Buehrer et al. .............. 375/142 |
| 2004/0052306 | A1* | 3/2004 | Ibrahim et al. .............. 375/152 |

FOREIGN PATENT DOCUMENTS

| | | |
|---|---|---|
| EP | 1257077 | 11/2002 |
| RU | 2192094 | 10/2002 |
| WO | 0067389 | 11/2000 |
| WO | WO0067389 A1 | 11/2000 |
| WO | WO0161902 A1 | 8/2001 |
| WO | 0205442 | 1/2002 |

OTHER PUBLICATIONS

International Search Report—PCT/US04/026349, International Searching Authority—European Patent Office, Dec. 29, 2004.
Written Opinion—PCT/US04/026349, International Searching Authority—European Patent Office, Dec. 29, 2004.
International Preliminary Report on Patentability—PCT/US04/026349, IPEA—US, Feb. 21, 2006.
Proakis, "Digital Communications," 4th Edition, (Book), McGraw-Hill, Aug. 2000., pp. 660-703.
European Search Report—EP10157800—Berlin—Apr. 26, 2010 (020305).

* cited by examiner

METHOD AND APPARATUS FOR REMOVING CODE ALIASES WHEN USING SHORT SYNCHRONIZATION CODES

CROSS-REFERENCE TO RELATED APPLICATIONS

This application is related to the following co-pending and commonly assigned patent application(s), all of which applications are incorporated by reference herein:

Application Ser. No. 10/650,272 entitled "METHOD AND APPARATUS FOR IMPROVING CHANNEL ESTIMATE BASED ON SHORT SYNCHRONIZATION CODE," filed on same date herewith, by Haitao Zhang, which is hereby incorporated by reference herein.

BACKGROUND OF THE INVENTION

1. Field of the Invention

The present invention relates to systems and methods for communicating information, and in particular to a system and method for estimating the impulse response of a communication channel using short synchronization codes.

2. Description of the Related Art

In packet-based communication systems, spreading codes are used for packet detection and synchronization purposes. Correlation techniques are used to identify and synchronize to its timing. In many instances, the spreading code sequence can be in the order of 1000 chips or more. Since the receiver must correlate through all possible delays, this process can result in unacceptable delays.

To ameliorate this problem, a short spreading code with good aperiodic autocorrelation can be used for packet detection and synchronization purposes. One example is the IEEE 802.11 Wireless Local Area Network (WLAN) system, which uses a length 11 Barker code as a spreading sequence for the preamble and the header of a packet. The short length of the spreading sequence makes it easy for receivers to quickly detect the presence of a packet in the communication channel and to synchronize to its timing.

In the case of a linear channel, for the purpose of receiver design, it is often desirable to estimate the impulse response of the communication channel. In the context of the WLAN, a multi-path linear channel is often utilized, and such communication channels require equalization for effective reception. Given an estimate of the impulse response of the communication channel, we can directly calculate equalizer coefficients through matrix computations, as opposed to the conventional adaptive algorithms. This is described IN "Digital Communications," by John G. Proakis, 4th edition, Aug. 15, 2000, which reference is hereby incorporated by reference herein. This allows equalizer coefficients to be computed in a digital signal processor (DSP) instead of in more expensive and less adaptable dedicated hardware implementing the adaptation algorithms.

Unfortunately, because the spreading code used is short (e.g. on the order of 11 symbols) a straightforward correlation using the spreading code will produce a distorted estimate. What is needed is a simple, computationally efficient technique that can be used to compute substantially undistorted communication channel impulse response estimates, even when the received signal was chipped with a short spreading code. The present invention satisfies that need.

SUMMARY OF THE INVENTION

To address the requirements described above, the present invention discloses a method and apparatus for estimating a communication channel impulse response h(t). The method comprises the steps of generating a data sequence $d_i$ having a constrained portion $Cd_i$ associated with at least two codes $w_0$, $w_1$, wherein a correlation $A_{code}(k)$ of the constrained portion $Cd_i$ with one of the codes $w_0$, $w_1$ is characterized by a maximum value at k=0 and less than maximum values at k≠0; generating a chip sequence $c_j$ having a chip period $T_c$ as the data sequence $d_i$ spread by a spreading sequence $S_i$ of length N; generating $co_m(t)=co(t+mNT_c)$ for m=0, 1, . . . , M by correlating a received signal r(t) with the spreading sequence $S_i$, wherein the received signal r(t) comprises the chip sequence $c_j$ applied to the communication channel; and generating an estimated communication channel impulse response $\hat{h}_M(t)$ as a combination of $co_m(t)$ and $d_m$ for m=0, 1, . . . , M. The apparatus comprises means for generating a data sequence $d_i$ having a constrained portion $Cd_i$ associated with at least two codes $w_0$, $w_1$, wherein a correlation $A_{code}(k)$ of the constrained portion $Cd_i$ with one of the codes $w_0$, $w_1$ is characterized by a maximum value at k=0 and less than maximum values at k≠0; means for generating a chip sequence $c_j$ having a chip period $T_c$ as the data sequence $d_i$ spread by a spreading sequence $S_i$ of length N; a correlator for generating $co_m(t)=co(t+mNT_c)$ for m=0, 1, . . . , M by correlating a received signal r(t) with the spreading sequence $S_i$, wherein the received signal r(t) comprises the chip sequence $c_j$ applied to the communication channel; and an estimator for generating an estimated communication channel impulse response $\hat{h}_M(t)$ as a combination of $co_m(t)$ and $d_m$ for m=0, 1, . . . , M.

The foregoing permits the impulse response h(t) of the communication channel to be accurately estimated, even with short chip codes. Non-intuitively, in the case of a time-limited channel impulse response, the present invention yields an estimate that can be made perfect in the limit of high signal-to-noise ratio (SNR).

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

System Model

Figure 1:
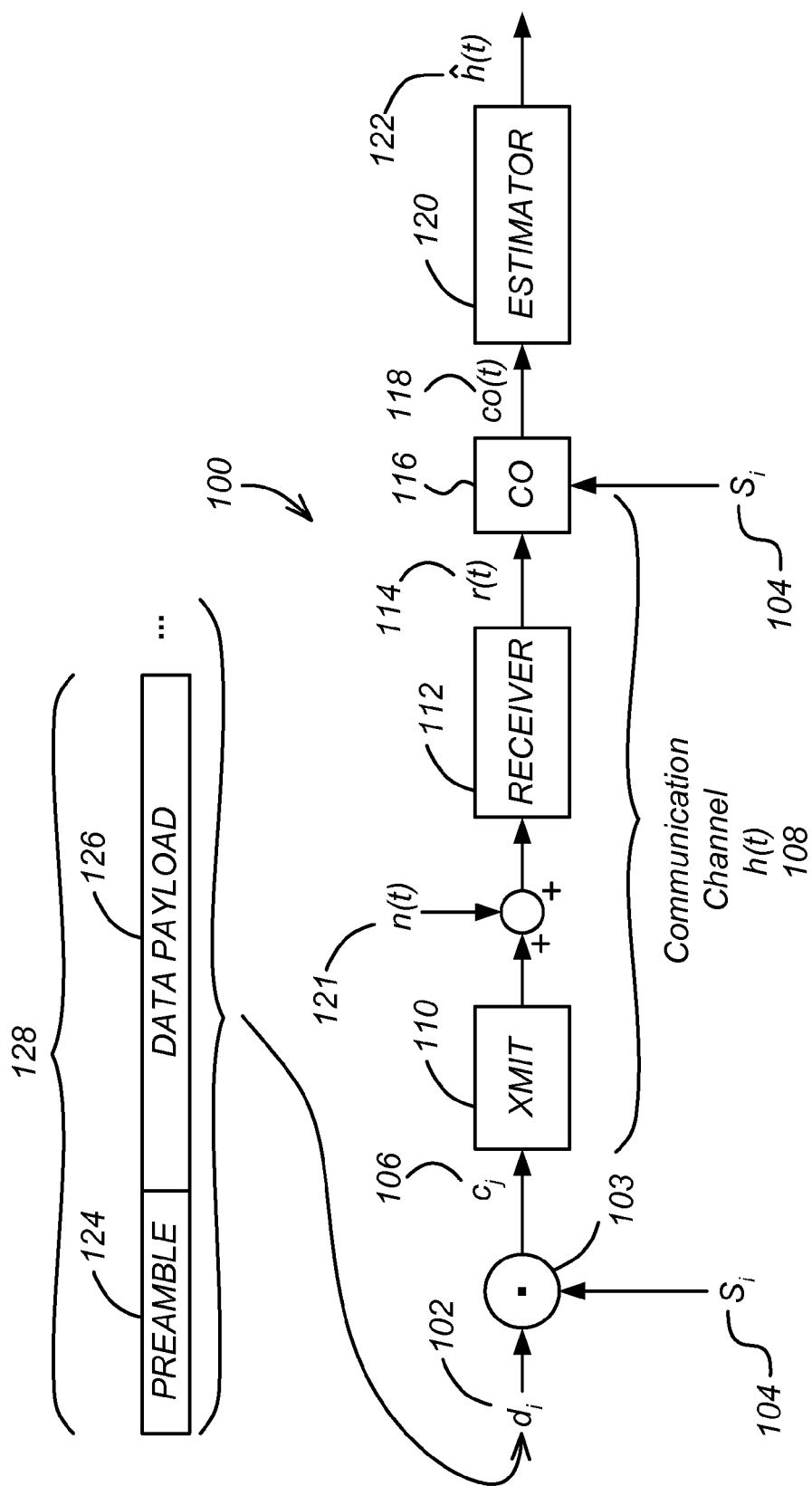
FIG. 1 is a diagram of a transceiver system.

FIG. 1 is a diagram of a transceiver system 100. Using signal spreader 103, a random data symbol sequence $d_i$ 102, comprising a series of data packets 128 (each of which may include a preamble 124 used by the receiver for identification purposes, as well as a data payload 126) is spread by a sequence $S_i$ 104 of length N: $\{S_n, 0 \leq n \leq N-1\}$ and having a chip period. The sequence $S_i$ 104 is known to the receiver 112 apriori. The spread chip sequence $c_j$ 106 is therefore:

$$c_j = c_{iN+n} = d_i \cdot S_n, 0 \leq n \leq N-1 \quad \text{Eq. (1)}$$

This spread chip sequence $c_j$ 106 is transmitted through a linear transmission channel 108 having a combined channel impulse response h(t). The transmitted signal is received by a receiver 112. The received waveform r(t) 114 is:

$$r(t) = \sum_{j=-\infty}^{\infty} c_j \cdot h(t - jT_c) + n(t) \quad \text{Eq. (2)}$$

where n(t) 121 is an additive noise component.

This formulation does not explicitly impose a causality requirement on h(t) 108. If explicit causality is desired, this can be accomplished by setting h(t)=0, t<0. For simplicity purposes, all the data and code sequences in the following discussion are assumed to be real, though the channel impulse response h(t) 108 and the additive noise component n(t) 121 could be complex in their baseband representations. Complex sequences could be easily accommodated if needed, but they are not common for synchronization purposes.

The receiver 112 receives the transmitted signal, and correlates the received signal r(t) 114 with the known spreading sequence $S_i$ 104 to identify the data as intended to be received by the receiver 112. Once the received signal r(t) 114 is received, the preamble can be examined to determine the address of the data and whether further processing is necessary.

Such systems also use the received signal to estimate the impulse response of the communication channel 108. This information is used to improve later detection and reception of signals from the transmitter 110. In circumstances where the spreading sequence $S_i$ 104 is relatively short, the data packet 128 must be detected quickly, and there is less data available to estimate the response of the communication channel 108.

Conventional Detection and Synchronization

For detection and synchronization purposes, the search for the spreading code is conventionally performed by correlating the received signal r(t) 114 with the spreading sequence. This is accomplished by the correlator 116. Although this correlation is typically done after sampling in the time domain, for notational simplicity, we do not perform the time domain discretization. The correlator 116 output co(t) 118 is given by:

$$co(t) = \sum_{i=0}^{N-1} r(t + (N-1)T_c - iT_c) \cdot S_{N-i-1} \quad \text{Eq. (3)}$$

$$= \sum_{i=0}^{N-1} r(t + iT_c) \cdot S_i \quad \text{Eq. (4)}$$

$$= \sum_{i=0}^{N-1} \sum_{j=-\infty}^{\infty} c_j \cdot h(t - (j-i)T_c) \cdot S_i + \tilde{n}(t) \quad \text{Eq. (5)}$$

$$= \sum_{l=-\infty}^{\infty} \sum_{i=0}^{N-1} c_{l+i} \cdot S_i \cdot h(t - lT_c) + \tilde{n}(t) \quad \text{Eq. (6)}$$

$$= \sum_{l=-\infty}^{\infty} D(l) \cdot h(t - lT_c) + \tilde{n}(t) \quad \text{Eq. (7)}$$

where D(l) is the correlation between the chip sequence and the spreading sequence and we will refer to it as the chip correlation.

For notational simplicity, we have introduced a (negative) group delay ($lT_c$) in calculating the correlator output 118. The correlator 116 output is given by the convolution of the chip correlation D(l) with the sampled communication channel impulse response $h(t-lT_c)$ plus a noise component $\tilde{n}(t)$. Upon further examination:

$$D(l) = \sum_{i=0}^{N-1} c_{l+i} \cdot S_i \quad \text{Eq. (8)}$$

$$= \sum_{i=0}^{N-1-n} d_m \cdot S_{n+i} \cdot S_i + \sum_{i=N-n}^{N-1} d_{m+1} \cdot S_{n+i-N} \cdot S_i \quad \text{Eq. (9)}$$

$$= d_m \cdot A(n) + d_{m+1} \cdot A(N-n), \quad \text{Eq. (10)}$$

$$l = mN+n, 0 \leq n < N \quad \text{Eq. (11)}$$

where A(n) is a two-sided aperiodic autocorrelation of the spreading sequence defined as:

$$A(n) = A(-n) = \sum_{i=0}^{N-1-n} S_i \cdot S_{i+n}, 0 \leq n < N \quad \text{Eq. (12)}$$

$$A(n) = 0, |n| \geq N$$

A(n) is a property of the code sequence that is known by the correlator 116 apriori.

For detection and synchronization purposes, the spreading sequence $S_i$ 104 is designed to have minimum values of A(k) when k≠0. However, for small (e.g. on the order of 10) values of N (short spreading codes), even the smallest side lobe magnitude is not negligible compared to the in-phase autocorrelation.

Barker sequences, when they exist, give the best aperiodic autocorrelation. For an 11 chip Barker sequence, $S_i$=1, −1, 1, 1, −1, 1, 1, 1, −1, −1, −1, the autocorrelation becomes A(i)=11, 0, −1, 0, −1, 0, 1, 0, −1, 0, −1 for 0≤i≤11. Note that even for Barker codes, because the spreading sequence $S_i$ 104 is of limited length, the autocorrelation A(i) includes significant side lobes.

The correlator 116 output 118 can be rewritten as:

$$co(t) = \sum_{j=-\infty}^{\infty} \sum_{i=0}^{N-1} D(jN+i) \cdot h(t-(jN+i)T_c) + \tilde{n}(t) \quad \text{Eq. (13)}$$

$$= \sum_{j=-\infty}^{\infty} \sum_{i=0}^{N-1} (d_j \cdot A(i) + d_{j+1} \cdot A(N-i)) \cdot \quad \text{Eq. (14)}$$

$$h(t-(jN+i)T_c) + \tilde{n}(t)$$

$$= \sum_{j=-\infty}^{\infty} \sum_{i=0}^{N-1} d_j \cdot (A(i) \cdot h(t-(jN+i)T_c) + \quad \text{Eq. (15)}$$

$$A(N-i) \cdot h(t-((j-1)N+i)T_c)) + \tilde{n}(t)$$

$$= \sum_{j=-\infty}^{\infty} \sum_{i=-N+1}^{N-1} d_j \cdot A(i) \cdot h(t-jNT_c - iT_c) + \tilde{n}(t) \quad \text{Eq. (16)}$$

$$= \sum_{j=-\infty}^{\infty} d_j \cdot \hat{h}(t-jNT_c) + \tilde{n}(t) \quad \text{Eq. (17)}$$

where the following is defined as the convolution of the spreading sequence aperiodic autocorrelation A(i) and the sampled channel impulse response $h(t-iT_c)$ as follows:

$$\hat{h}(t) = \sum_{i=-N+1}^{N-1} A(i) \cdot h(t-iT_c) \quad \text{Eq. (18)}$$

This is an estimate of the combined communication channel 108 impulse response $\hat{h}(t)$ at the output of the code correlator 116.

The above equations can be more succinctly written using a convolutional notation. Defining a convolution of two infinite sequences $A_i$ and $B_i$ as $$C = A \otimes B \Leftrightarrow C(i) = \sum_j A(j) \cdot B(i-j), \forall i \quad \text{Eq. (19)}$$

By defining an operator $$\overset{t}{O}^T$$

that converts any sequence O to a time domain function using the Dirac delta function:

$$\overset{t}{B}^T(t) \equiv \sum_i B(i) \cdot \delta(t-iT) \quad \text{Eq. (20)}$$

we can also define the convolution of a function with a sequence using a normal convolution of two functions:

$$C(t) = A(t) \otimes \overset{t}{B}^T \Leftrightarrow C(t) = \sum_j A(t-jT)B(j) \quad \text{Eq. (21)}$$

Using the above notations and further, by adopting the following definitions:

$$u(iN) = d_i(\text{data}) \quad \text{Eq. (22A)}$$

$$u(iN+n) = 0, \; 0 < n < N \quad \text{Eq. (22B)}$$

$$S(n) = \begin{cases} S_n & 0 \le n < N \\ 0, & \text{otherwise} \end{cases} \quad \text{Eq. (22C)}$$

(a time-limited chipping sequence)

the foregoing equations (1), (2), (3), (6), (12), (18), (16), (17) can be rewritten as:

$$c = u \otimes S \quad \text{Eq. (1')}$$

$$r = h \overset{\tau T_c}{\otimes_C} + n_o \quad \text{Eq. (2')}$$

$$co = r \otimes \overset{tT_c}{S_-} \quad \text{Eq. (3')}$$

$$= h \overset{\tau T_c}{\otimes_C} \otimes \overset{tT_c}{S_-} + \tilde{n}, \text{ where } S_-(n) = S(-n) \quad \text{Eq. (6')}$$

$$A = S \otimes S_- \quad \text{Eq. (12')}$$

$$\hat{h} = h \overset{tT_c}{\otimes A} \quad \text{Eq. (18')}$$

$$co = \hat{h} \overset{\tau T_c}{\otimes_u} + \tilde{n} \quad \text{Eq. (16')}$$

$$= \hat{h} \overset{*}{\otimes} d^{NT_c} + \tilde{n} \quad \text{(Eq. 17')}$$

Determining a Communication Channel Impulse Response Estimate

For simplicity of notation, in the remaining discussion, we assume that data symbols are binary. The results however, can be generally applied to non-binary data.

Because the correlator 116 has access to the same code sequence $S_i$ 104 that was used to generate the spread chip sequence $c_j$ 106 before transmission, the correlator 116 can correlate the received signal r(t) 114 with the code sequence $S_i$ 104. However, aliasing can occur with short code sequences $S_i$ 104, because time delays may cause the correlator 116 to correlate different portions of adjacent code sequences. Conventionally, these aliasing effects are reduced by integrating or summing over multiple (e.g. M) code periods, as discussed below.

As described in Eqs. (13)-(17), based on the correlator 116 output 118 we can form an estimate of the channel impulse response over one code period $T_c$:

$$\hat{h}_1(t) = d_0 \cdot co(t) \quad \text{Eq. (23)}$$

$$= \hat{h}(t) + \sum_{j \ne 0} d_0 \cdot d_j \cdot \hat{h}(t-jNT_c) + d_0 \cdot \tilde{n}(t)$$

where $d_0$ is a value of the data at time t=0.

This is a rough approximation to $\hat{h}(t)$, corrupted by aliased copies of $\hat{h}(t)$ spaced at multiples of $NT_c$ away from the desired copy. These aliasing and the additive noise terms can be reduced through further summation over M code periods:

$$\hat{h}_M(t) = \frac{1}{M} \sum_{m=0}^{M-1} d_m \cdot co(t + mNT_c) \qquad \text{Eq. (24)}$$

$$= \hat{h}(t) + \frac{1}{M} \sum_{m=0}^{M-1} \sum_{j \neq m} d_m \cdot d_j \cdot \hat{h}(t + (m-j)NT_c) + \qquad \text{Eq. (25)}$$

$$\tilde{n}'_M(t)$$

$$= \hat{h}(t) + \frac{1}{M} \sum_{l \neq 0} \sum_{m=0}^{M-1} d_m \cdot d_{l+m} \cdot \hat{h}(t - lNT_c) + \tilde{n}'_M(t) \qquad \text{Eq. (26)}$$

The foregoing indicates that through output 122 of estimator 120, by removing the data modulation through correlation with the data sequence, we obtain an estimate $\hat{h}$ of the channel impulse response plus terms defined by the autocorrelation of the data sequence, which vanish when summed over infinite terms.

If $D_M(l)$ is defined as:

$$D_M(l) = \frac{1}{M} \sum_{m=0}^{M-1} d_m \cdot d_{l+m} \text{ then} \qquad \text{Eq. (27)}$$

$$\hat{h}_M = \hat{h} \otimes D_M^{lNT_c} + \tilde{n}'_M \qquad \text{Eq. (28)}$$

wherein $\hat{h}_M$ is an estimate of the communication channel impulse response h(t). When the data sequence $d_i$ 102 is random, white and independent of the additive noise n(t) 121, and in the limit of M→∞:

$$D_\infty(l) = \delta_{l0}, \tilde{n}'_\infty = 0 \qquad \text{Eqs. (29)}$$

$$\hat{h}_\infty = \hat{h}$$

Therefore, in the limit of infinite summation (as M approaches infinity), we obtain an estimate that is equal to the true channel impulse response h(t) convolved with the aperiodic autocorrelation of the spreading sequence $S_i$ 104.

As the foregoing demonstrates, we can not obtain the true channel impulse response h(t) with simple integration. The best we have is smeared by the autocorrelation of the spreading sequence $S_i$ 104. In cases where the spreading sequence $S_i$ 104 is long, the autocorrelation approaches a delta function, and the side lobes disappear. However, when the spreading sequence $S_i$ 104 is short, the sidelobes of the autocorrelation are not negligible and will cause significant distortion to the estimate of the communication channel impulse response h(t).

Improved Channel Estimates for Short Spreading Sequences

As is demonstrated below, the present invention improves the communication channel impulse response estimate by filtering the first estimated communication channel impulse response $\hat{h}_M(t)$ to generate the estimated communication channel impulse response h(t) with a filter f selected at least in part according to the spreading sequence $S_i$. In particular, when the time span of the communication channel 108 is limited, a zero-forcing deconvolution can be used to improve the estimate.

Figure 2:
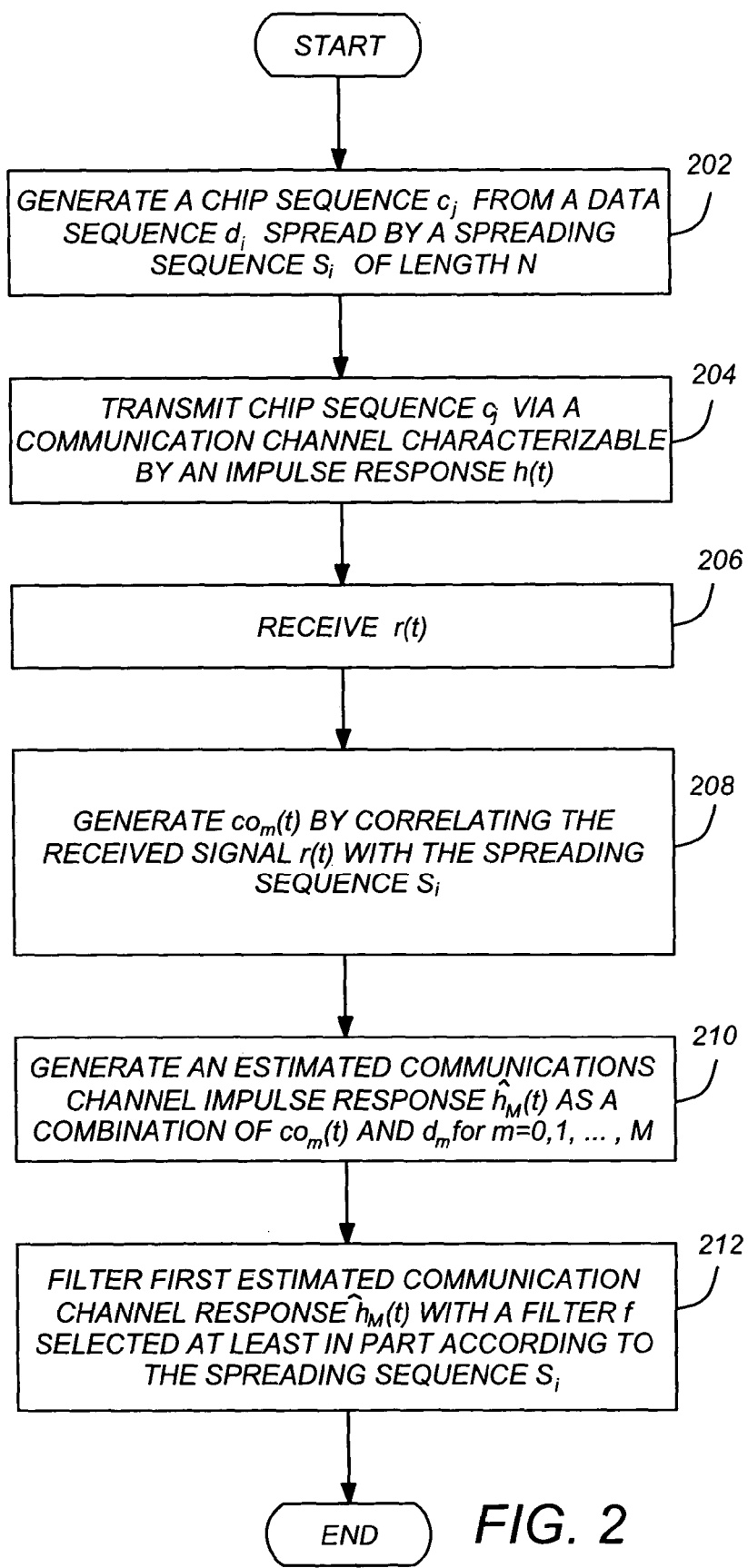
FIG. 2 is a block diagram illustrating process steps that can be used to implement the present invention.

FIG. 2 is a block diagram illustrating process steps that can be used to implement the present invention.

Figure 3:
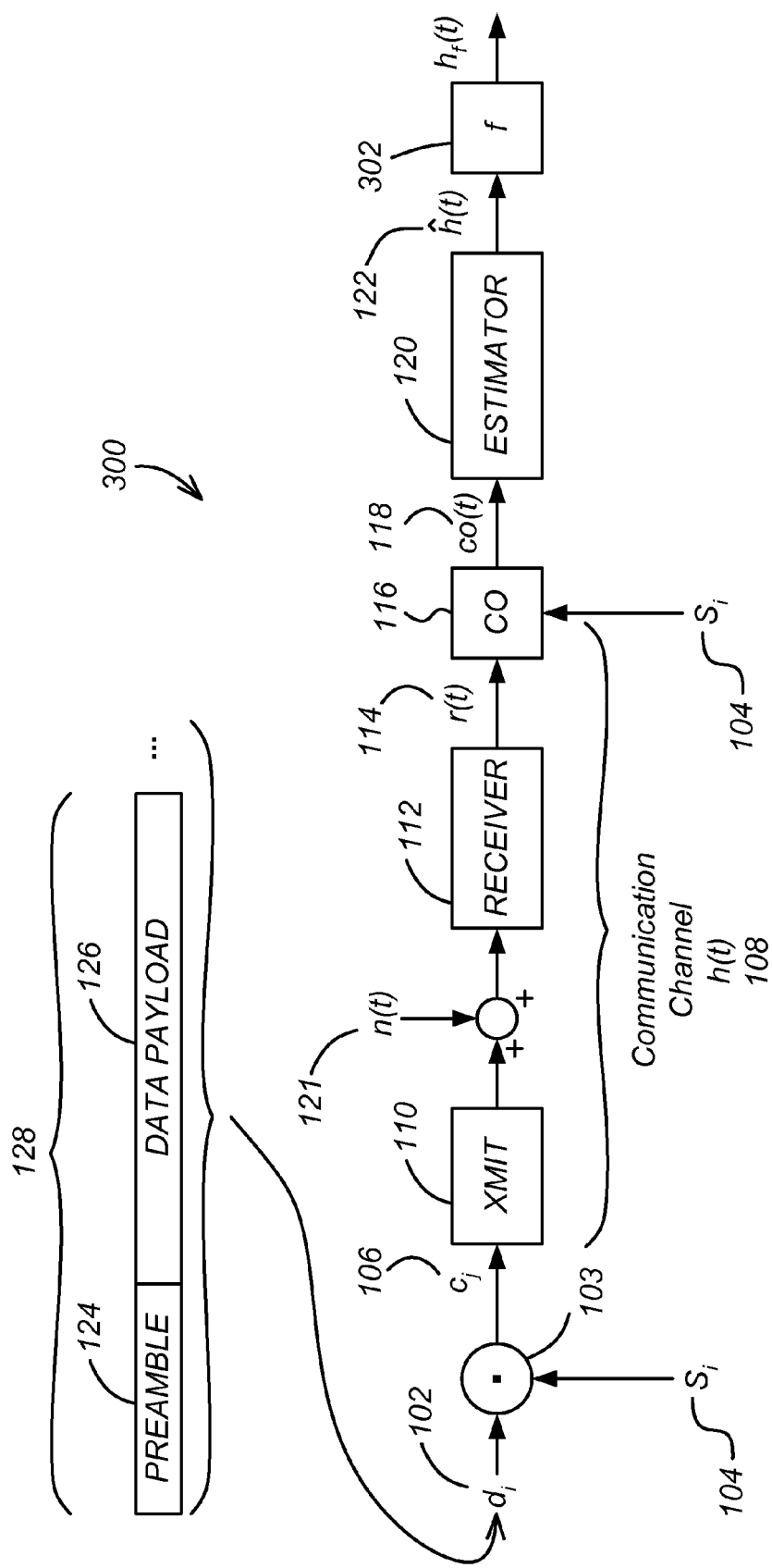
FIG. 3 is a diagram of a transceiver system utilizing a filter f to improve the estimated communication channel impulse response.

FIG. 3 is a diagram of a transceiver system 300 utilizing the filter f described above to filter the first estimated communication channel impulse response $\hat{h}_M(t)$ to generate an improved estimate suitable for short spreading sequences $S_i$ 104.

Referring to FIG. 2 and FIG. 3, blocks 202 through 208 recite steps that are used to generate $co_m(t)$ 118. A spread chip sequence $c_j$ 106 is generated from a data symbol sequence $d_i$ 102 and a spreading sequence $S_i$ 104 of length N, as shown in block 202. The chip sequence $c_j$ 106 is transmitted via a communication channel 108 as shown in block 204, and received as shown in block 206. The communication channel includes the transmitter 110 and the receiver 112. The received signal r(t) 114 is then correlated with the spreading sequence $S_i$ 104, by the correlator 116 to generate $co_m(t)$ as shown in block 208.

In block 210, an estimated communications channel impulse response $\hat{h}_M(t)$ is generated by the estimator 120 as a combination of $co_m(t)$ and $d_m$ for m=0, 1, K, M This can be accomplished, for example using the relationship described in Eq. (24) above.

Finally, in block 212, the first estimated communication channel response $\hat{h}_M(t)$ is filtered with a filter f selected at least in part according to the spreading sequence $S_i$ 104. In one embodiment, the filter is a finite impulse response (FIR) filter f 302 designed with the following constraints:

$$A_f = A(\hat{x})f \qquad \text{Eq. (29)}$$

$$A_f(0)=1, A_f(n)=0, 0<|n|\leq L \qquad \text{Eq. (30)}$$

wherein $A(\hat{x})f$ is the convolution of the autocorrelation of the spreading sequence $S_i$ 104 and the filter, and $A_f$ is the autocorrelation of the spreading sequence $S_i$ 104 after filtering.

Figure 4:
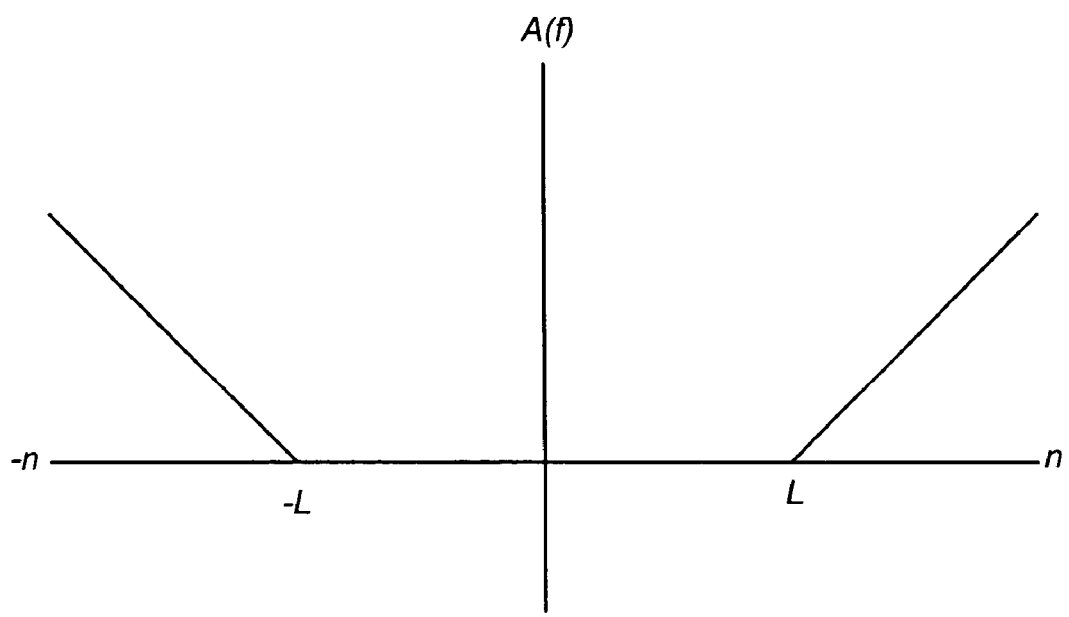
FIG. 4 is a diagram showing the response of the filter.

FIG. 4 is a diagram showing the response of the filter f 302 described in Eqs. (29) and (30).

When the estimate of the communication channel impulse response is filtered with this filter, we obtain:

$$h_f = \hat{h} \otimes f^{\tau T_c} \qquad \text{Eq. (31)}$$

$$= h \otimes A^{\tau T_c} \otimes f^{\tau T_c}$$

$$= h \otimes A_f^{\tau T_c}$$

Using this technique, the effects of the side lobes (aliased versions of the autocorrelation of the spreading sequence $S_i$ 104) are eliminated between L and −L. The side lobes are not completely removed (since the filter passes components greater than L and less than −L) but the result near the origin (n=0) is of primary interest, and the effect of the side lobes can be significantly reduced in this region.

If the time span (duration of the impulse response) of the communications channel is less than $LT_c$, i.e.

$$\exists t_1 < t_2, t_2 - t_1 < LT_c, \forall t < t_1 \cup t > t_2 : h(t) \approx 0 \qquad \text{Eq. (32)}$$

(that is, there exists a time $t_2$ greater than $t_1$ defining a time interval $t_2-t_1$ less than $LT_c$, and for all time outside of the interval $t_2-t_1$, h(t) is close to zero), Then, the filtered estimate $h_f$ (or, in the earlier notation, $h_f(t)$) is composed of an exact copy of h (h(t)), plus some aliased versions of it in non-overlapping locations. So in this case h is resolvable from $h_f$.

Such a filter with length 2L+1 can be designed with the simple zero-forcing criteria:

$$\sum_{i=-L}^{L} A(n-i) \cdot f(i) = A_f(n), \; -L \leq n \leq L \qquad \text{Eq. (33)}$$

wherein f(i) is the impulse response of the filter f 302 such that $A_f(n)$ is a convolution of A(n) and f(i), $A_f(n)=1$ for n=0 and $A_f(n)=0$ for $0<|n|\leq L$, and $$A(n) = A(-n) = \sum_{i=o}^{N-1-n} S_i \cdot S_{i+n}, \; 0 \leq n \leq N,$$

and wherein N is a length of the chip sequence $S_i$ 104. L can be chosen such that the product $LT_c$ (the chip period $T_c$ is known) is approximately equal to the time span (e.g. the approximate duration of the impulse response) of the channel 108.

Note that the value A(n−i) is well defined ... it is a property of the spreading sequence $S_i$ 104, which is known apriori.

As usual, the matrix structure of the linear equations is Toeplitz. By the design requirement of the spreading sequence $S_i$, the matrix should be well conditioned. The filter coefficients can be computed offline given the spreading sequence and desired window width L.

While the foregoing has been described with respect to non-recursive filters, other filters, such as recursive filters may also be used. A recursive filter, for example, may provide perfect filtering of the sidelobes, but the result may not be the quell conditioned matrix, hence the solution may be more difficult to determine. In fact, any filter of length 2L+1 can be defined.

Super Coded Transmit Sequences

It has been shown that given ȟ and with filtering, it is possible to recover the true channel impulse response for a time limited channel. However, in the foregoing discussion, ȟ was obtained through integration over multiple spreading sequence periods. The number of periods we need to integrate over can be large especially if $2L \geq N$, since we rely on the autocorrelation of the data to suppress the aliased copies of ȟ.

In one embodiment of the present invention, supercodes, such as Walsh-like supercodes, are used to drastically reduce the amount of the integration required. This technique is especially useful in systems having sufficient signal-to-noise ratio (SNR).

Consider a pair of length 2 Walsh codes $w_0=\{+1,+1\}$ and $w_1=\{+1,-1\}$. These codes can be used to form a data sequence:

... +, +, +, −, −, −, ...

Any 2-symbol length segment from this sequence can be described as either $w_0$ or $-w_0$, except for a single $w_1$ in the center. If this sequence is now correlated with $w_1$, the resulting correlation will be characterized by a single peak in the center and zeros elsewhere (except near the boundaries). Negatives of the two codes may be taken (e.g. $w_0=\{-1,-1\}$ and $w_1=\{-1,+1\}$) and/or their roles may be swapped (e.g. $w_1=\{+1,+1\}$ and $w_0=\{+1,-1\}$) with the same result. The three additional patterns thus obtained and their correlator patterns are listed below:

... −, −, −, −, +, +, +, +... −, +

... −, +, −, +, +, −, +, −... +, +

... +, −, +, −, −, +, −, +... −, −

Since the following results are equivalent for all of the above patterns when the additive noise is uncorrelated at sampling points, we limit our discussion to the first data sequence (i.e. ... +, +, +, −, −, − ... ). In this case, $$d_i = +1, \; \forall l_1 < i \leq 0 \qquad \text{Eq. (34)}$$

$$d_i = -1, \; \forall l_2 \geq i > 0 \qquad \text{Eq. (35)}$$

$$\hat{h}_2(t) = \frac{1}{2}(d_0 \cdot co(t) + d_1 \cdot co(t + NT_c)) \qquad \text{Eq. (36)}$$

$$= \hat{h}(t) + \sum_{l \neq 0}(d_l - d_{l+1}) \cdot \hat{h}(t - lNT_c) + \tilde{n}'_2(t) \qquad \text{Eq. (37)}$$

$$= \hat{h}(t) + \sum_{l \leq l_1 \cup l \geq l_2}(d_l - d_{l+1}) \cdot \hat{h}(t - lNT_c) + \tilde{n}'_2(t) \qquad \text{Eq. (38)}$$

If the condition that $-l_1 N > (2N+L) I \; l_2 N > (2N+L)$ can be satisfied, ȟ can be reconstructed free of aliasing interference, and by deconvolution (aforementioned filtering technique), h can be reconstructed as well.

From the foregoing, it can be determined that a small supercode imposed on a portion of the data sequence can provide an alias free estimate of the communication channel impulse response when the channel response is time-limited. The only source of distortion from this estimate comes from the additive noise, which can be suppressed by the spreading gain times a factor of 2 (to account for the supercode). When the noise is low, such an approach is preferable over long integrations.

For moderate values of L, such code sequences can be easily embedded within a longer preamble to packet data, probably with multiple copies, without adversely affecting the spectrum properties of the transmission. In addition, when the signal to noise ratio (SNR) is low, traditional integration as outlined in the first half of this section can still be carried out on such a preamble to obtain a higher processing gain against the additive noise.

Figure 5:
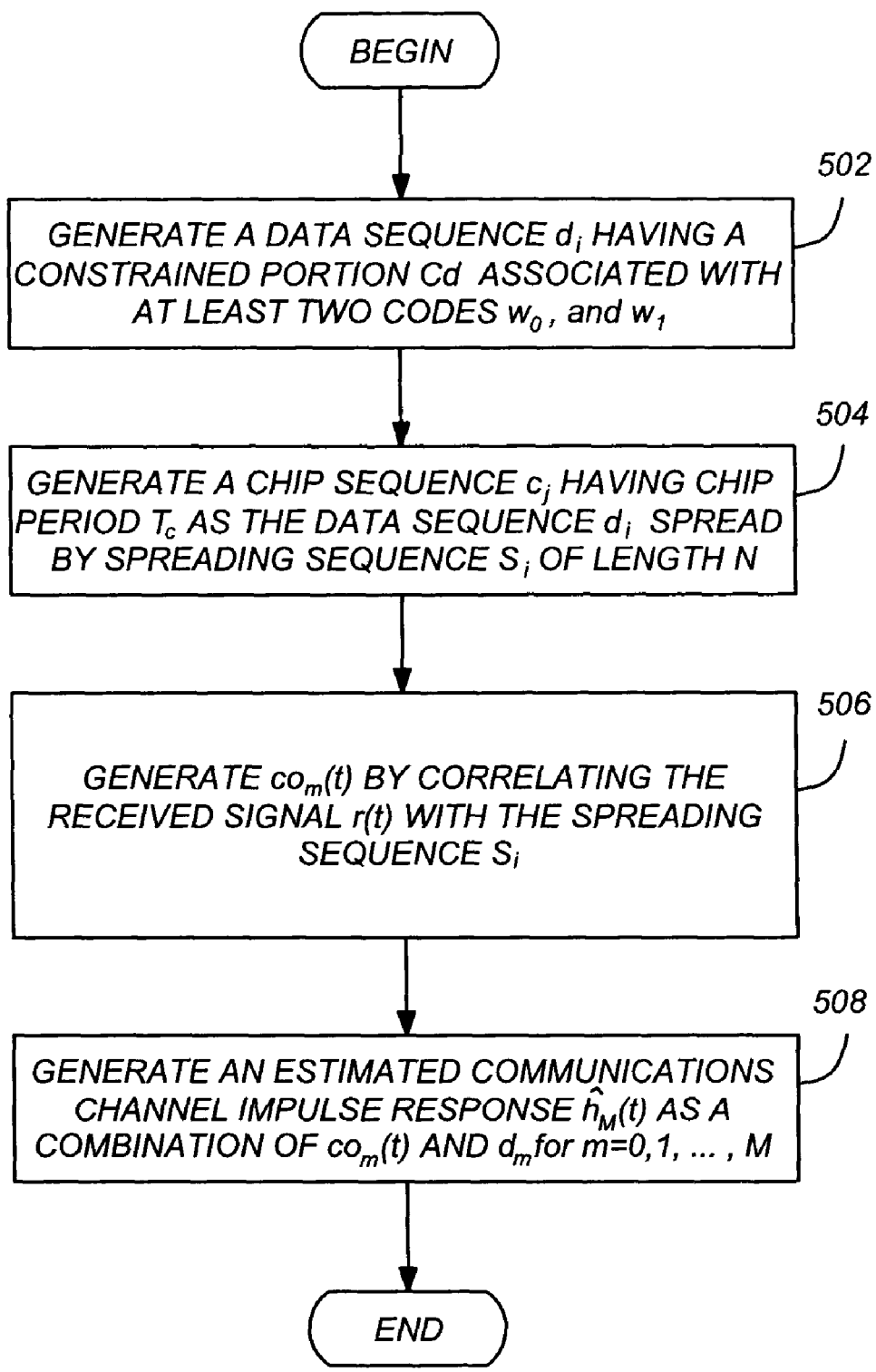
FIG. 5 is a flowchart describing exemplary processing steps that can be used to improve the reconstruction of the value of the communication channel impulse response using super codes imposed on the portion of the data sequence.

FIG. 5 is a flowchart describing exemplary processing steps that can be used to improve the reconstruction of the value of the communication channel impulse response by using supercode imposed on a portion of the data sequence.

Figure 6:
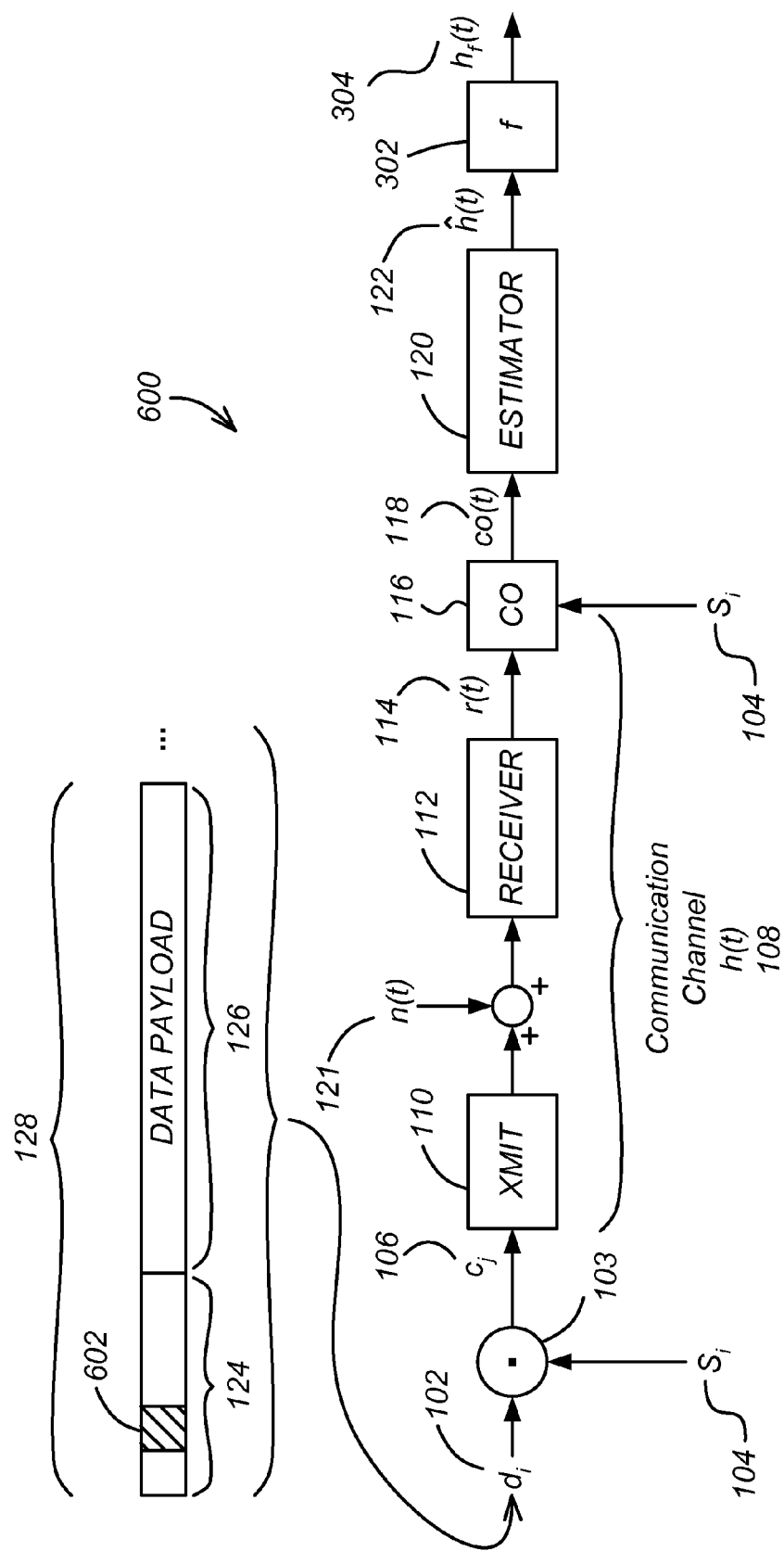
FIG. 6 is a diagram of a transceiver system utilizing super code to transmit sequences.

FIG. 6 is a diagram of a transceiver system 600 utilizing super coded transmit sequences to generate an improved communication channel impulse response estimate suitable for short spreading sequences $S_i$ 104.

In block 502, a data sequence $d_i$ 102 is generated. The data sequence $d_i$ 102 includes one or more data packets 128, each data packet having a preamble 124 including a constrained portion $Cd_i$ 602. The preamble 124, can be, for example, in the form of a pseudorandom code.

The constrained portion $Cd_i$ 602 is associated with at least two codes, $w_0$ and $w_1$. The codes $w_0$ and $w_1$ are selected such that the correlation $A_{code}(k)$ of the constrained portion $Cd_i$ 602 and at least one of the codes $w_0$ and $w_1$, is characterized by a maximum value at k=0, and value less than the maximum value at k≠0.

Ideally, the correlation $A_{code}(k)$ of the constrained portion $Cd_i$ 602 is an impulse, with $A_{code}(k)$ equal to one at $k=0$, and equal to zero at all other values for k. However, because such correlation characteristics are typically not realizable, codes $w_0$ and $w_1$ can be chosen to approximate this ideal. For example, codes $w_0$ and $w_1$ can be chosen such that the correlation $A_{code}(k)$ of the constrained portion $Cd_i$ 602 and at least one of the codes $w_0$ and $w_1$, is such that $A_{code}(k)=1$ at $k=0$ and $A_{code}(k) \approx 0$ for substantially all $k \neq 0$. Or, codes $w_0$ and $w_1$ can be chosen such that the correlation $A_{code}(k)$ of the constrained portion $Cd_i$ 602 and at least one of the codes $w_0$ and $w_1$, is such that $A_{code}(k)=0$ for $0<|k|\leq J$, wherein J is selected to minimize the correlation of the constrained portion $Cd_i$ with the one of the codes $w_0$, $w_1$ for substantially all $k \neq 0$.

In one embodiment, the constrained portion $Cd_i$ 602 comprises the pair of length two Walsh codes in the first sequence described above. Other embodiments are envisioned in which the codes are of another length (other than length two), or are codes other than a Walsh code.

In block 504, a chip sequence $c_j$ 106 is generated. The chip sequence $c_j$ 106 is generated by applying a spreading sequence $S_i$ 104 of length N and having a chip period $T_c$ to the data sequence $d_i$ 102.

This spread chip sequence $c_j$ 106 is transmitted through a linear transmission channel 108 having a combined channel impulse response h(t). The transmitted signal is received by a receiver 112.

In block 506, the receiver 112 receives the transmitted signal, and correlates the received signal r(t) 114 with the known spreading sequence $S_i$ 104 to identify the data as intended to be received by the receiver 112. This is accomplished by generating $co_m(t)=co(t+mNT_c)$ for m=0, 1, Λ, M, using techniques analogous to those which were described above.

In block 508, an estimated communication channel impulse response $\hat{h}_M(t)$ is generated as a combination of the correlation $co_m(t)$ and the data sequence $d_m$ for m=0, 1, Λ, M.

In one embodiment, the codes $w_0$ and $w_1$ are two symbol-long Walsh codes, and $\hat{h}_M(t)$ is computed as $$\frac{1}{M} \sum_{m=0}^{M-1} d_m \cdot co(t+mNT_c),$$

with M=2. In this case, $\hat{h}_M(t)$ equals $$\hat{h}_2(t) = \frac{1}{2}(d_0 \cdot co(t) + d_1 \cdot co(t+NT_c)).$$

Hence, where the data has been constrained with a symbol such as a Walsh super code, an improved estimate of the communications channel impulse response can be obtained by taking two consecutive values of the correlation of the received data and the spreading sequence and multiplying each result by the data sequence. In the example of Walsh codes $w_0=\{-1,-1\}$ and $w_1=\{-1,+1\}$ applied to the sequence ...+,+,+,-,-,-..., and $w_1$ applied at the receiver, the result is that one of the values of co(t) is multiplied by a one, and the other is multiplied by a minus one. Hence, the output will produce essentially no response until the transition between the two Walsh codes occurs, at which time a clean, alias-free copy of the communications channel impulse response will be produced.

A length 2 supercode for improved alias suppression has been described. When the SNR is low and longer integration period is desirable, it would appear attractive to generalize the code to longer lengths. Counterintuitively, this is not possible. This result is shown below, by presenting a definition of such codes and showing that no such codes with length larger than 2 exist for binary data sequences.

An infinite sequence A forms an impulsive correlation pair with a length L finite sequence B if A satisfies the following equations:

$$A(i)=B(i), \forall 0 \leq i \leq L$$

$$\sum_{i=0}^{L-1} A(i+n) \cdot B(i) = 0, \forall n \neq 0$$

By contradiction, it can be shown that for binary sequences, such a pair does not exist for L>2. Supposing such sequences exist, it is apparent that L must be even. Considering two such cases (L=4k and L=4k+2)

In the first case, L=4k, consider the first constraint:

$$\sum_{i=0}^{L-1} A(i-1) \cdot B(i) = 0, \qquad \text{Eq. (39a)}$$

$$A(-1) \cdot B(0) + \sum_{i=1}^{L-1} B(i-1) \cdot B(i) = 0 \qquad \text{Eq. (39b)}$$

Since there are 4k summands in the equation taking values from {+1,−1} half of them or 2k terms must be positive, and the other half negative. The product of all the summands must therefore be 1.

$$A(-1) \cdot B(0) \cdot \prod_{i=1}^{L-1}(B(i-1) \cdot B(i)) = 1 \qquad \text{Eqs. (40)}$$

$$A(-1) \cdot B(L-1) = 1$$

$$A(-1) = B(L-1)$$

Similar arguments can be used to show that:

$$A(i)=B(L+i), -L<i<0 \qquad \text{Eq. (41)}$$

But this implies that:

$$\sum_{i=0}^{L-1} A(i-L) \cdot B(i) = A(-L) \cdot B(0) + \sum_{i=1}^{L-1} A(i-L) \cdot B(i) \qquad \text{Eqs. (42)}$$

$$= A(-L) \cdot B(0) + \sum_{i=1}^{L-1} B(i) \cdot B(i)$$

$$= A(-L) \cdot B(0) + L - 1 > 0$$

which contradicts the assumption that the cross-correlation is zero everywhere except at the origin. Hence, by contradiction, we have shown that for binary sequences, such a pair does not exist for L>2.

A similar argument can be applied for the second case, L=4k+2, except that the product of all the summands in each equations must be −1, since now we must have 2k+1 negative terms. This leads to:

$$A(i)=(-1)^i B(L+i), -L<i<0 \qquad \text{Eq. (43)}$$

When k>0, $$\sum_{i=0}^{L-1} A(i-2) \cdot B(i) = A(-2) \cdot B(0) + A(-1) \cdot B(1) + \sum_{i=2}^{L-1} A(i-2) \cdot B(i)$$

$$= B(L-2) \cdot B(0) - B(L-1) \cdot B(1) + \sum_{i=2}^{L-1} B(i-2) \cdot B(i) = 0$$

$$\sum_{i=0}^{L-1} A(i-L+2) \cdot B(i) = \sum_{i=0}^{L-3} A(i-L+2) \cdot B(i) + A(0) \cdot B(L-2) + A(1) \cdot B(L-1)$$

$$= \sum_{i=0}^{L-3} (-1)^i B(i+2) \cdot B(i) + B(0) \cdot B(L-2) + B(1) \cdot B(L-1)$$

$$= B(L-2) \cdot B(0) + B(L-1) \cdot B(1) + \sum_{i=2}^{L-1} (-1)^i B(i-2) \cdot B(i)$$

$$= 0$$

Eqs. (44)

Summing the two equations together we have:

$$B(L-2) \cdot B(0) + \sum_{i=1}^{2k} B(2i-2) \cdot B(2i) = 0 \quad \text{Eq. (45)}$$

However, this result is clearly impossible since there are an odd number of terms on the left. By contradiction it is therefore shown that it is impossible to satisfy the constraints when L>2 for binary sequences.

Noise Effects

The foregoing has demonstrated that distortions due to this spreading sequence design can be removed from the estimate of the communications channel impulse response. Attention is now turned to the remaining distortion caused by the additive noise n(t) 121. Assuming that the noise source is white and stationary and is filtered by a receiver filter for bandwidth matching, its distortion measure can be defined as follows:

$$\Delta = E\left[\frac{1}{t_2 - t_1} \int_{t_1}^{t_2} |\tilde{n}''_M(t)|^2 dt\right] \quad \text{Eq. (46)}$$

$$\tilde{n}_M = \tilde{n}'_M \otimes f^{\frac{tT_c}{c}} \quad \text{Eq. (47)}$$

$$\tilde{n}''_M(t) = \sum_{l=-L}^{L} \tilde{n}'_M(t - lT_c) \cdot f(l)$$

$$= \frac{1}{M} \sum_{l=-L}^{L} \sum_{m=0}^{M-1} d_m \cdot \tilde{n}(t + mNT_c - lT_c) \cdot f(l)$$

$$= \frac{1}{M} \sum_{l=-L}^{L} \sum_{m=0}^{M-1} \sum_i d_m \cdot n(t + mNT_c + iT_c - lT_c) \cdot S(i) \cdot f(l)$$

$$= \frac{1}{M} \sum_{m=0}^{M-1} \sum_j d_m \cdot n(t + mNT_c + jT_c) \cdot R_{fS}(j)$$

Eqs. (48)

where $$R_{fS}(j) = \sum_{l=-L}^{L} f(l) \cdot S(l+j) \quad \text{Eq. (49)}$$

The ensemble expectation of Eq. (46) can be taken over n(t), whose autocorrelation can be determined by the front end receive filter, and is assumed to be known).

$$R_{nm}(\tau) = E[n_0^*(t) \cdot n_0(t+\tau)]$$

$$\Delta = \frac{1}{M^2} \sum_{m'=0}^{M-1} \sum_{m=0}^{M-1} \sum_{j'} \sum_j d_m \cdot R_{fS}(j) \cdot R_{nn}((m'-m)NT_c + (j'-j)T_c) \cdot R_{fS}(j') \cdot d_{m'}$$

$$= \sum_{j'} \sum_j \overline{R}_{fS}^M(j) \cdot R_{nn}((j'-j)T_c) \cdot \overline{R}_{fS}^M(j')$$

Eqs. (50)

$$\overline{R}_{fS}^M(j) = \frac{1}{M} \sum_{m=0}^{M-1} d_m \cdot R_{fS}(j + mN) \quad \text{Eq. (51)}$$

When the noise n(t) is white, we have:

$$R_{nn}(kT_c) = 0. \forall k \neq 0 \quad \text{Eq. (52)}$$

$$\Delta = R_{nn}(0) \sum_j |\overline{R}_{fS}^M(j)|^2$$

EXAMPLES

FIG. 7 through FIG. 10 are diagrams illustrating the performance improvements achieved by application of the present invention. These illustrated examples are for a case whereby a length 11 Barker code is used as the spreading sequence $S_i$ 104. FIGS. 7-10 show normalized magnitudes as a function of chip timing. No adjustments were made for group delays introduced by correlation, filtering and windowing, therefore time coordinates should be treated in the relative sense. FIGS. 7-10 also do not include the effects of additive noise.

Figure 7:
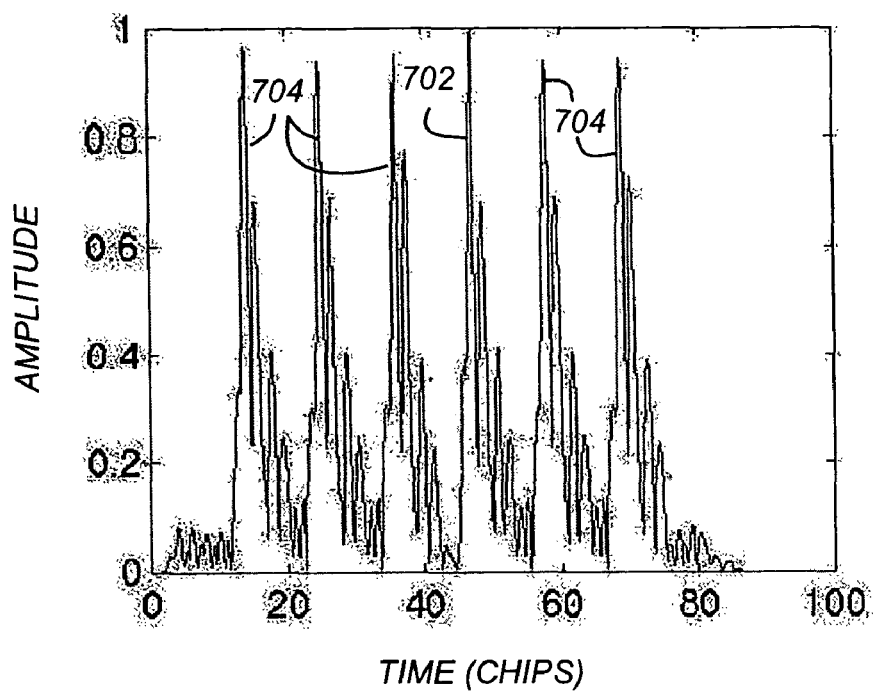
FIG. 7 is a diagram presenting a correlator output using 11 symbol long Barker code.

FIG. 7 is a diagram presenting a correlator 116 output using a length 11 Barker code and conventional communication channel impulse response estimation techniques. The correlator 116 output shows a main lobe peak 702, and multiple spurious peaks 704. These spurious peaks 704 (which are 11 chips, or $NT_c$ seconds, apart due to the length 11 Barker code) are due to the repeated transmission of the short code $S_i$ 104, which are "aliased" back upon each other. If the length of the periodic spreading sequence $S_i$ 104 were longer, there would be fewer spurious peaks 704, and the peaks 704 would not overlap the main lobe peak 702 as much as is shown in FIG. 7.

Figure 8:
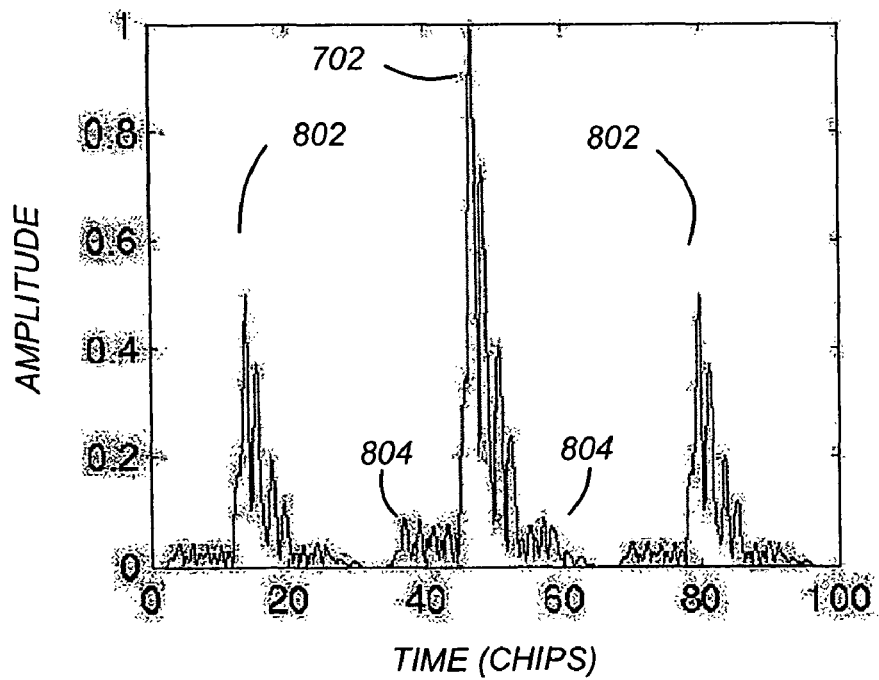
FIG. 8 is a diagram presenting a correlator output using Walsh codes as an input super code.

FIG. 8 is a diagram presenting a correlator 116 output using the Walsh codes in conjunction with the supercode technique described in FIG. 5. To generate this plot, the input data was constrained with two symbol-long Walsh codes $w_0$ and $w_1$, and the output was processed by summing two successive outputs of the correlator 116 as shown in Eq. (36). For the 11 chips on either side of the main lobe peak 702, there is zero correlation, and many of the spurious correlator peaks 704 that were apparent in FIG. 7 are no longer evident. Note, however that since only six bits of the data sequence are constrained . . . +, +, +, −, −, −, . . . , some aliased versions of the main lobe peak 704 (labeled 802) are present (33 chips from the main lobe peak 702). However, since these aliased versions 802 are widely separated from the main lobe peak 704, an accurate estimate of the communications channel impulse response can be obtained. Note that a similar result can also be achieved without constraining the input sequence with the super code, but this would require integration over large number of symbols (e.g. M in Eq. (26) would be large). Note also that the main lobe peak 702 still includes minor peaks because the estimator 120 produces ĥ, which is a smeared version of h. These undesirable components 804, caused by the autocorrelation of the spreading sequence 104, cannot be removed by constraining the data sequence. Instead, these undesirable components 804 can be removed by filtering as described with respect to FIG. 9 below.

Figure 9:
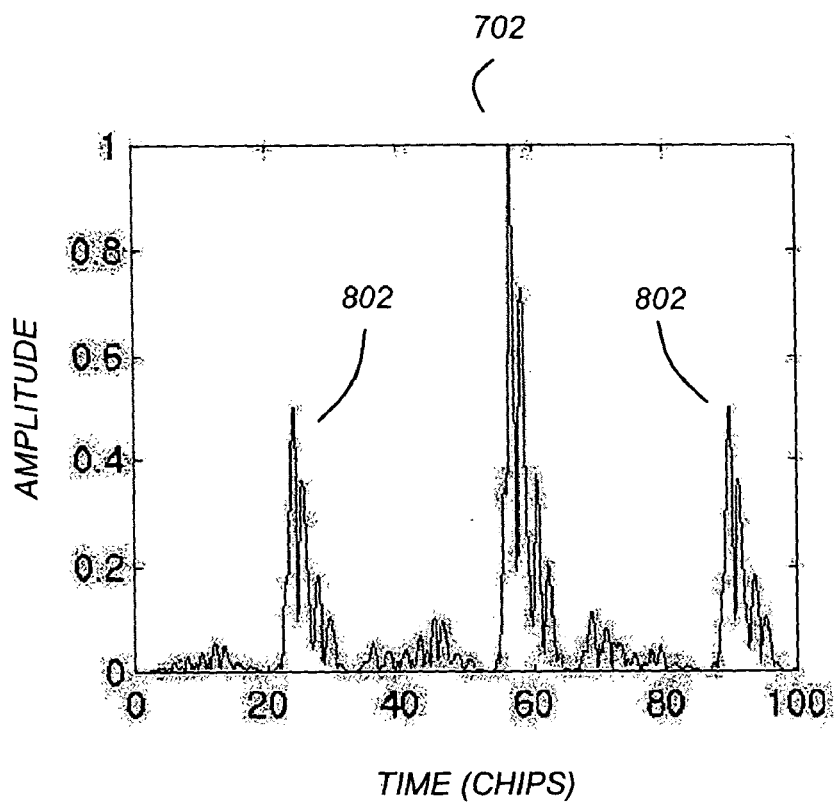
FIG. 9 is a diagram presenting a correlator output after postprocessing with a filter f as described in FIG. 2 and FIG. 3.

FIG. 9 is a diagram presenting a correlator 116 output shown in FIG. 8 after postprocessing with a filter f as described in FIGS. 2 and 3. Note that the sidelobes 802 shown in FIG. 8, have been pushed away from the main lobe peak 702, and some of the undesirable components 804 of the main lobe peak 702 have been filtered. Also note that the data indexing (the chips shown as the time axis) of FIG. 9 has changed relative to the data indexing of FIG. 8. As described above, this difference is an artifact of the software used to plot FIG. 7-FIG. 11 and is not associated with the applicant's invention.

Figure 10:
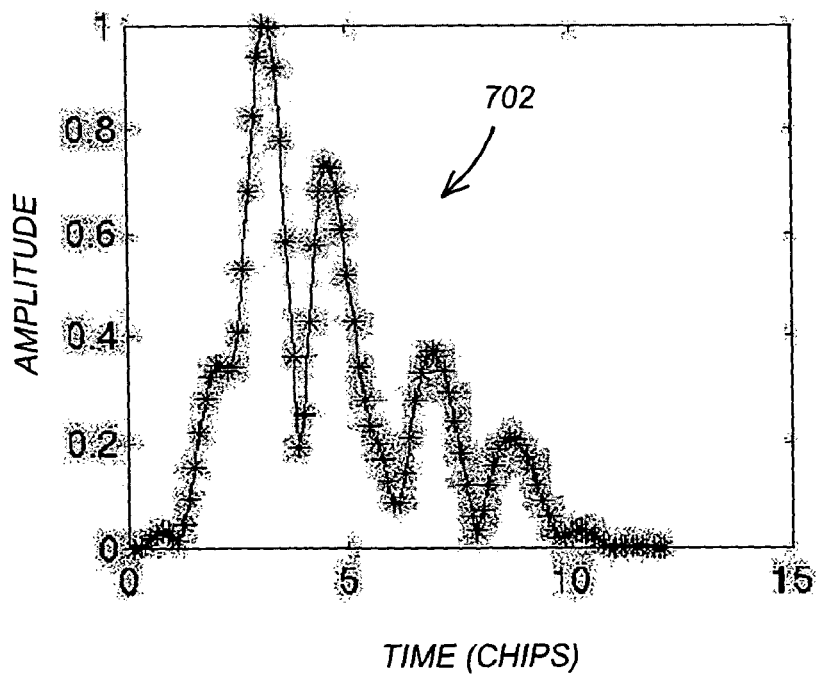
FIG. 10 is a diagram presenting a more detailed view of the main lobe peak, showing the estimate of the communication channel impulse response in the actual communications channel impulse response.

FIG. 10 is a diagram presenting a more detailed view of the main lobe peak 702, showing the estimate of the communication channel impulse response (indicated by the asterisks) and the actual communication channel impulse response. Note that the estimated communication channel impulse response follows that of the actual response very closely.

Hardware Environment

Figure 11:
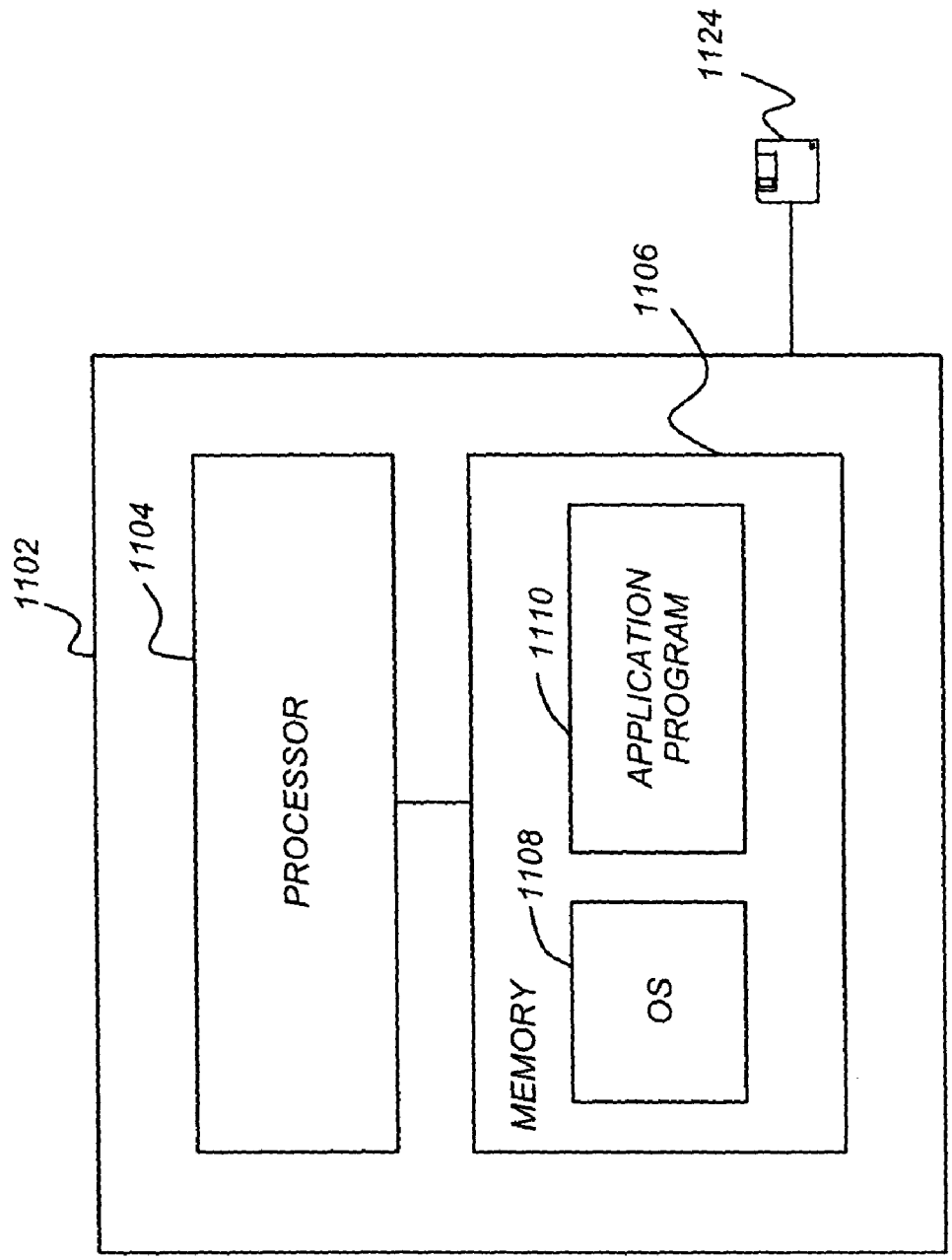
FIG. 11 is a diagram presenting one embodiment of a processor that can be used to practice the present invention.

FIG. 11 and is a diagram illustrating an exemplary processor system 1102 that could be used in the implementation of selected elements of the present invention (including, for example, portions of the transmitter 110, the receiver 112, the correlator 116, the estimator 120, or the filter 302).

The processor system 1102 comprises a processor 1104 and a memory 1106, such as random access memory (RAM). Generally, the processor system 1102 operates under control of an operating system 1108 stored in the memory 1106. Under control of the operating system 1108, the processor system 1102 accepts input data and commands and provides output data. Typically, the instructions for performing such operations are also embodied in an application program 1110, which is also stored in the memory 1106. The processor system 1102 may be embodied in a microprocessor, a desktop computer, or any similar processing device.

Instructions implementing the operating system 1108, and the application program 1110 may be tangibly embodied in a computer-readable medium, e.g., data storage device 1124, which could include one or more fixed or removable data storage devices, such as a zip drive, floppy disc drive, hard drive, CD-ROM drive, tape drive, etc. Further, the operating system 1108 and the application program 1110 are comprised of instructions which, when read and executed by the computer 1102, causes the computer 1102 to perform the steps necessary to implement and/or use the present invention. Application program 1110 and/or operating instructions may also be tangibly embodied in memory 1106 and/or data communications devices, thereby making an application program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention. For example, an application-specific integrated circuit (ASIC) or a Field-Programmable Gate Array (FPGA) can be used to implement selected functions, including the correlator 116, and filtering functions can be performed by a general-purpose processor, as described above.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of estimating a communication channel impulse response h(t), comprising the steps of:

generating a data sequence $d_i$, having a constrained portion $Cd_i$, associated with at least two codes $w_0$, $w_1$, wherein a correlation $A_{code}(k)$ of the constrained portion $Cd_i$ with one of the codes $w_0$, $w_1$ is characterized by a maximum value at k=0 and less than maximum values at k≠0, where k is an index for the constrained portion;

using a signal spreader for generating a chip sequence $c_j$ having a chip period $T_c$ as the data sequence $d_i$ spread by a spreading sequence $S_i$ of length N;

using a correlator for generating $co_m(t)=co(t+mNT_c)$ for m=0, 1, . . . , M by correlating a received signal r(t) with the spreading sequence $S_i$ wherein the received signal r(t) comprises the chip sequence $c_j$ applied to a communication channel; and generating an estimated communication channel impulse response $ĥ_M(t)$ as a combination of $co_m(t)$ and $d_m$ for m=0, 1, . . . , M, where $d_m$ is m-th symbol and M is number of symbols in the constrained portion used to generate the estimated communication channel impulse response $ĥ_M(t)$.

2. The method of claim 1, wherein the step of generating an estimated communication channel impulse response $ĥ_M(t)$ as a combination of $co_m(t)$ and $d_m$ for m=0, 1, . . . , M comprises the step of computing $ĥ_M(t)$ as $$\frac{1}{M}\sum_{m=0}^{M-1} d_m \cdot co(t+mNT_c).$$

3. The method of claim 2, wherein the at least two codes $w_0$, $w_1$ are each two symbols in length and wherein M=2.

4. The method of claim 1, wherein the data sequence $d_i$ includes a preamble having a pseudorandom code including the constrained portion of the data sequence $d_i$.

5. The method of claim 1, wherein $A_{code}(k)=1$ at $k=0$ and $A_{code}(k)=0$ for substantially all $k\neq 0$.

6. The method of claim 1, wherein $A_{code}(k)=0$ for $0<|k|\leq J$, wherein J is selected to minimize the correlation of the constrained portion $Cd_i$ with the one of the codes $w_0$, $w_1$ for substantially all $k\neq 0$.

7. The method of claim 6, wherein 2J is a length of the constrained portion $Cd_i$.

8. The method of claim 1, wherein $A_{code}(k)=1$ at $k=0$ and $A_{code}(k)\approx 0$ for substantially all $k\neq 0$.

9. The method of claim 1, wherein each of the at least two codes $w_0$, $w_1$ comprises two symbols.

10. The method of claim 1, wherein each of the at least two codes $w_0$, $w_1$ consists of two symbols.

11. The method of claim 1, wherein the codes $w_0$, $w_1$ comprise Walsh codes.

12. The method of claim 1, further comprising the step of
filtering the estimated communication channel impulse response $\hat{h}_M(t)$ with a filter f selected at least in part according to the spreading sequence $S_i$.

13. The method of claim 12, wherein the filter f is further selected at least in part according to an autocorrelation $A(n)$ of the spreading sequence $S_i$.

14. The method of claim 13, wherein the filter f is further selected at least in part according to a duration of the impulse response of the communication channel $h(t)$.

15. The method of claim 13, wherein the filter f is further selected at least in part according to a zero-forcing criteria $$\sum_{i=-L}^{L} (A(n-i) \cdot f(i) = A_f(n), -L \leq n \leq L,$$

wherein:
f(i) is an impulse response of the filter f such that $A_f(n)$ is a convolution of $A(n)$ and $f(i)$;
$A_f(n)=1$ for $n=0$ and $A_f(n)=0$ for $0<|n|\leq L$; and $$A(n) = A(-n) = \sum_{i=o}^{N-1-n} S_i \cdot S_{i+n}, 0 \leq n \leq N.$$

16. The method of claim 15, wherein the parameter L is chosen such that a time duration of the impulse response of the communication channel $h(t)$ is less than $LT_c$.

17. The method of claim 15, wherein the parameter L is chosen such that a time duration of the impulse response of the communication channel $h(t)$ is approximately equal to $LT_c$.

18. The method of claim 1, wherein N is less than 20.

19. An apparatus for estimating a communication channel impulse response $h(t)$, comprising:
means for generating a data sequence $d_i$ having a constrained portion $Cd_i$, associated with at least two codes $w_0$, $w_1$, wherein a correlation $A_{code}(k)$ of the constrained portion $Cd_i$ with one of the codes $w_0$, $w_1$, is characterized by a maximum value at $k=0$ and less than maximum values at $k\neq 0$, where k is an index for the constrained portion;

means for generating a chip sequence $c_j$ having a chip period $T_c$ as the data sequence $d_i$ spread by a spreading sequence $S_i$ of length N;
means for generating $co_m(t)=co(t+mNT_c)$ for $m=0, 1, \ldots, M$ by correlating a received signal $r(t)$ with the spreading sequence $S_i$, wherein the received signal $r(t)$ comprises the chip sequence $c_j$, applied to a communication channel; and
means for generating an estimated communication channel impulse response $\hat{h}_M(t)$ as a combination of $co_m(t)$ and $d_m$ for $m=0, 1, \ldots, M$, where $d_m$ is m-th symbol and M is number of symbols in the constrained portion used to generate the estimated communication channel impulse response $\hat{h}_M(t)$.

20. The apparatus of claim 19, wherein the means for generating an estimated communication channel impulse response $\hat{h}_M(t)$ as a combination of $co_m(t)$ and
$d_m$ for $m=0, 1, \ldots, M$ comprises means for computing $\hat{h}_M(t)$ as $$\frac{1}{M} \sum_{m=0}^{M-1} d_m \cdot co(t + mNT_c).$$

21. The apparatus of claim 20, wherein the at least two codes $w_0$, $w_1$, are each two symbols in length and wherein M=2.

22. The apparatus of claim 19, wherein the data sequence $d_i$ includes a preamble having a pseudorandom code including the constrained portion of the data sequence $d_i$.

23. The apparatus of claim 19, wherein $A_{code}(k)=1$ at $k=0$ and $A_{code}(k)=0$ for substantially all $k\neq 0$.

24. The apparatus of claim 19, wherein $A_{code}(k)=0$ for $0<|k|\leq J$, wherein J is selected to minimize the correlation of the constrained portion $Cd_i$, with the one of the codes $w_0$, $w_1$, for substantially all $k\neq 0$.

25. The apparatus of claim 24, wherein 2J is a length of the constrained portion $Cd_i$.

26. The apparatus of claim 19, wherein $A_{code}(k)=1$ at $k=0$ and $A_{code}(k)\approx 0$ for substantially all $k\neq 0$.

27. The apparatus of claim 19, wherein each of the at least two codes $w_0$, $w_1$, comprises two symbols.

28. The apparatus of claim 19, wherein each of the at least two codes $w_0$, $w_1$, consists of two symbols.

29. The apparatus of claim 19, wherein the codes $w_0$, $w_1$ comprise Walsh codes.

30. The apparatus of claim 19, further comprising
means for filtering the estimated communication channel impulse response $\hat{h}_M(t)$ with a filter f selected at least in part according to the spreading sequence $S_i$.

31. The apparatus of claim 30, wherein the filter f is further selected at least in part according to an autocorrelation $A(n)$ of the spreading sequence $S_i$.

32. The apparatus of claim 31, wherein the filter f is further selected at least in part according to a duration of the impulse response of the communication channel $h(t)$.

33. The apparatus of claim 31, wherein the filter f is further selected at least in part according to a zero-forcing criteria $$\sum_{i=-L}^{L} (A(n-i) \cdot f(i) = A_f(n), -L \leq n \leq L,$$

wherein:
f(i) is an impulse response of the filter f such that $A_f(n)$ is a convolution of A(n) and f(i);
$A_f(n)=1$ for n=0 and $A_f(n)=0$ for $0<|n|\leq L$; and $$A(n) = A(-n) = \sum_{i=o}^{N-1-n} S_i \cdot S_{i+n}, 0 \leq n \leq N.$$

34. The apparatus of claim 33, wherein the parameter L is chosen such that a time duration of the impulse response of the communication channel h(t) is less than $LT_c$.

35. The apparatus of claim 33, wherein the parameter L is chosen such that a time duration of the impulse response of the communication channel h(t) is approximately equal to $LT_c$.

36. The apparatus of claim 19, wherein N is less than 20.

37. An apparatus for estimating a communication channel impulse response h(t), comprising:
means for generating a data sequence $d_i$ having a constrained portion $Cd_i$, associated with at least two codes $w_0, w_1$, wherein a correlation $A_{code}(k)$ of the constrained portion $Cd_i$ with one of the codes $w_0, w_1$ is characterized by a maximum value at k=0 and less than maximum values at k≠0, where k is an index for the constrained portion;
means for generating a chip sequence $c_j$ having a chip period $T_c$ as the data sequence $d_i$, spread by a spreading sequence $S_i$ of length N;
means for generating $co_m(t)=co(t+mNT_c)$ for m=0, 1, ..., M by correlating a received signal r(t) with the spreading sequence $S_i$, wherein the received signal r(t) comprises the chip sequence $c_j$ applied to a communication channel; and
means for generating an estimated communication channel impulse response $\hat{h}_M(t)$ as a combination of $co_m(t)$ and $d_m$ for m=0, 1, ..., M, where $d_m$ is m-th symbol and M is number of symbols in the constrained portion used to generate the estimated communication channel impulse response $\hat{h}_M(t)$.

38. The apparatus of claim 37, wherein the means for generating an estimated communication channel impulse response comprises means for computing $\hat{h}_M(t)$ as $$\frac{1}{M} \sum_{m=0}^{M-1} d_m \cdot co(t + mNT_c).$$

39. The apparatus of claim 38, wherein the at least two codes $w_0, w_1$ are each two symbols in length and wherein M=2.

40. The apparatus of claim 37, wherein the data sequence $d_i$ includes a preamble having a pseudorandom code including the constrained portion of the data sequence $d_i$.

41. The apparatus of claim 37, wherein $A_{code}(k)=1$ at k=0 and $A_{code}(k)=0$ for substantially all k≠0.

42. The apparatus of claim 37, wherein $A_{code}(k)=0$ for $0<|k|\leq J$, wherein J is selected to minimize the correlation of the constrained portion $Cd_i$ with the one of the codes $w_0, w_1$ for substantially all k≠0.

43. The apparatus of claim 42, wherein 2J is a length of the constrained portion $Cd_i$.

44. The apparatus of claim 37, wherein $A_{code}(k)=1$ at k=0 and $A_{code}(k)\approx 0$ for substantially all k≠0.

45. The apparatus of claim 37, wherein each of the at least two codes $w_0, w_1$ comprises two symbols.

46. The apparatus of claim 37, wherein each of the at least two codes $w_0, w_1$ consists of two symbols.

47. The apparatus of claim 37, wherein the codes $w_0, w_1$ comprise Walsh codes.

48. The apparatus of claim 37, further comprising
means for filtering the estimated communication channel impulse response $\hat{h}_M(t)$, according to the spreading sequence $S_i$.

49. The apparatus of claim 48, wherein the means for filtering uses an autocorrelation A(n) of the spreading sequence $S_i$.

50. The apparatus of claim 49, wherein the means for filtering uses a duration of the impulse response of the communication channel h(t).

51. The apparatus of claim 49, wherein the means for filtering uses a zero-forcing criteria $$\sum_{i=-L}^{L} (A(n-i) \cdot f(i) = A_f(n), -L \leq n \leq L,$$

wherein:
f(i) is an impulse response of the filter f such that $A_f(n)$ is a convolution of A(n) and f(i);
$A_f(n)=1$ for n=0 and $A_f(n)=0$ for $0<|n|\leq L$; and $$A(n) = A(-n) = \sum_{i=o}^{N-1-n} S_i \cdot S_{i+n}, 0 \leq n \leq N.$$

52. The apparatus of claim 51, wherein the parameter L is chosen such that a time duration of the impulse response of the communication channel h(t) is less than $LT_c$.

53. The apparatus of claim 51, wherein the parameter L is chosen such that a time duration of the impulse response of the communication channel h(t) is approximately equal to $LT_c$.

54. The apparatus of claim 37, wherein N is less than 20.

55. A method of estimating a communication channel impulse response, comprising:
using a receiver for obtaining a received sequence via a communication channel, the received sequence comprising a chip sequence obtained by spreading a data sequence with a spreading sequence, the data sequence having a constrained portion selected such that correlation of the constrained portion with a code is characterized by a maximum value at one point in the constrained portion and less than maximum values at all other points in the constrained portion;
using a correlator for generating a correlated sequence by correlating the received sequence with the spreading sequence; and
using an estimator for generating an estimated communication channel impulse response based on the correlated sequence, the constrained portion, and the code.

56. The method of claim 55, wherein the generating the estimated communication channel impulse response comprises
determining multiple data symbols based on the constrained portion and the code, multiplying the multiple data symbols with the correlated sequence at multiple time offsets, and generating the estimated communication channel impulse based on a sum of results of the multiplication.

57. The method of claim 56, wherein the code comprises two symbols, and wherein two data symbols are multiplied with the correlated sequence at two time offsets.

58. The method of claim 55, wherein the code is a Walsh code of length 2.

59. The method of claim 55, wherein the constrained portion is selected such that the correlation of the constrained portion with the code is characterized by the maximum value at one point in the constrained portion and zero at all other points in the constrained portion.

60. The method of claim 55, further comprising:
filtering the estimated communication channel impulse response based on a filter to obtain a filtered estimate of the communication channel impulse response, the filter being selected based on the spreading sequence.

61. An apparatus for estimating a communication channel impulse response, comprising:
means for obtaining a received sequence via a communication channel, the received sequence comprising a chip sequence obtained by spreading a data sequence with a spreading sequence, the data sequence having a constrained portion selected such that correlation of the constrained portion with a code is characterized by a maximum value at one point in the constrained portion and less than maximum values at all other points in the constrained portion;
means for generating a correlated sequence by correlating the received sequence with the spreading sequence; and
means for generating an estimated communication channel impulse response based on the correlated sequence, the constrained portion, and the code.

62. The apparatus of claim 61, wherein the means for generating the estimated communication channel impulse response comprises
means for determining multiple data symbols based on the constrained portion and the code,
means for multiplying the multiple data symbols with the correlated sequence at multiple time offsets, and
means for generating the estimated communication channel impulse based on a sum of results of the multiplication.

63. The apparatus of claim 62, wherein the code comprises two symbols, and wherein two data symbols are multiplied with the correlated sequence at two time offsets.

64. The apparatus of claim 61, wherein the code is a Walsh code of length 2.

65. The apparatus of claim 61, wherein the constrained portion is selected such that the correlation of the constrained portion with the code is characterized by the maximum value at one point in the constrained portion and zero at all other points in the constrained portion.

66. The apparatus of claim 61, further comprising:
means for filtering the estimated communication channel impulse response based on a filter to obtain a filtered estimate of the communication channel impulse response, the filter being selected based on the spreading sequence.

67. A non-transitory computer-readable medium storing thereon instructions for causing a computer to estimate a communication channel impulse response, the instructions comprising:
instructions to obtain a received sequence via a communication channel, the received sequence comprising a chip sequence obtained by spreading a data sequence with a spreading sequence, the data sequence having a constrained portion selected such that correlation of the constrained portion with a code is characterized by a maximum value at one point in the constrained portion and less than maximum values at all other points in the constrained portion;
instructions to generate a correlated sequence by correlating the received sequence with the spreading sequence; and
instructions to generate an estimated communication channel impulse response based on the correlated sequence, the constrained portion, and the code.

68. The non-transitory computer-readable medium of claim 67, wherein the instructions for causing the computer to estimate the communication channel impulse response, comprise:
instructions to determine multiple data symbols based on the constrained portion and the code,
instructions to multiply the multiple data symbols with the correlated sequence at multiple time offsets, and
instructions to generate the estimated communication channel impulse based on a sum of results of the multiplication.

69. The non-transitory computer-readable medium of claim 68, wherein the code comprises two symbols, and wherein two data symbols are multiplied with the correlated sequence at two time offsets.

70. The non-transitory computer-readable medium of claim 67, wherein the code is a Walsh code of length 2.

71. The non-transitory computer-readable medium of claim 67, wherein the constrained portion is selected such that the correlation of the constrained portion with the code is characterized by the maximum value at one point in the constrained portion and zero at all other points in the constrained portion.

72. The non-transitory computer-readable medium of claim 67, the instructions further comprising:
instructions to filter the estimated communication channel impulse response based on a filter to obtain a filtered estimate of the communication channel impulse response, the filter being selected based on the spreading sequence.

73. An apparatus for estimating a communication channel impulse response, comprising:
a receiver configured to obtain a received sequence via a communication channel, the received sequence comprising a chip sequence obtained by spreading a data sequence with a spreading sequence, the data sequence having a constrained portion selected such that correlation of the constrained portion with a code is characterized by a maximum value at one point in the constrained portion and less than maximum values at all other points in the constrained portion;
a correlator configured to generate a correlated sequence by correlating the received sequence with the spreading sequence; and
an estimator configured to generate an estimated communication channel impulse response based on the correlated sequence, the constrained portion, and the code.

* * * * *